INVENTORS
ROBERT IREDELL
BY HERMAN T. KRAFT
Evans & McCoy
ATTORNEYS

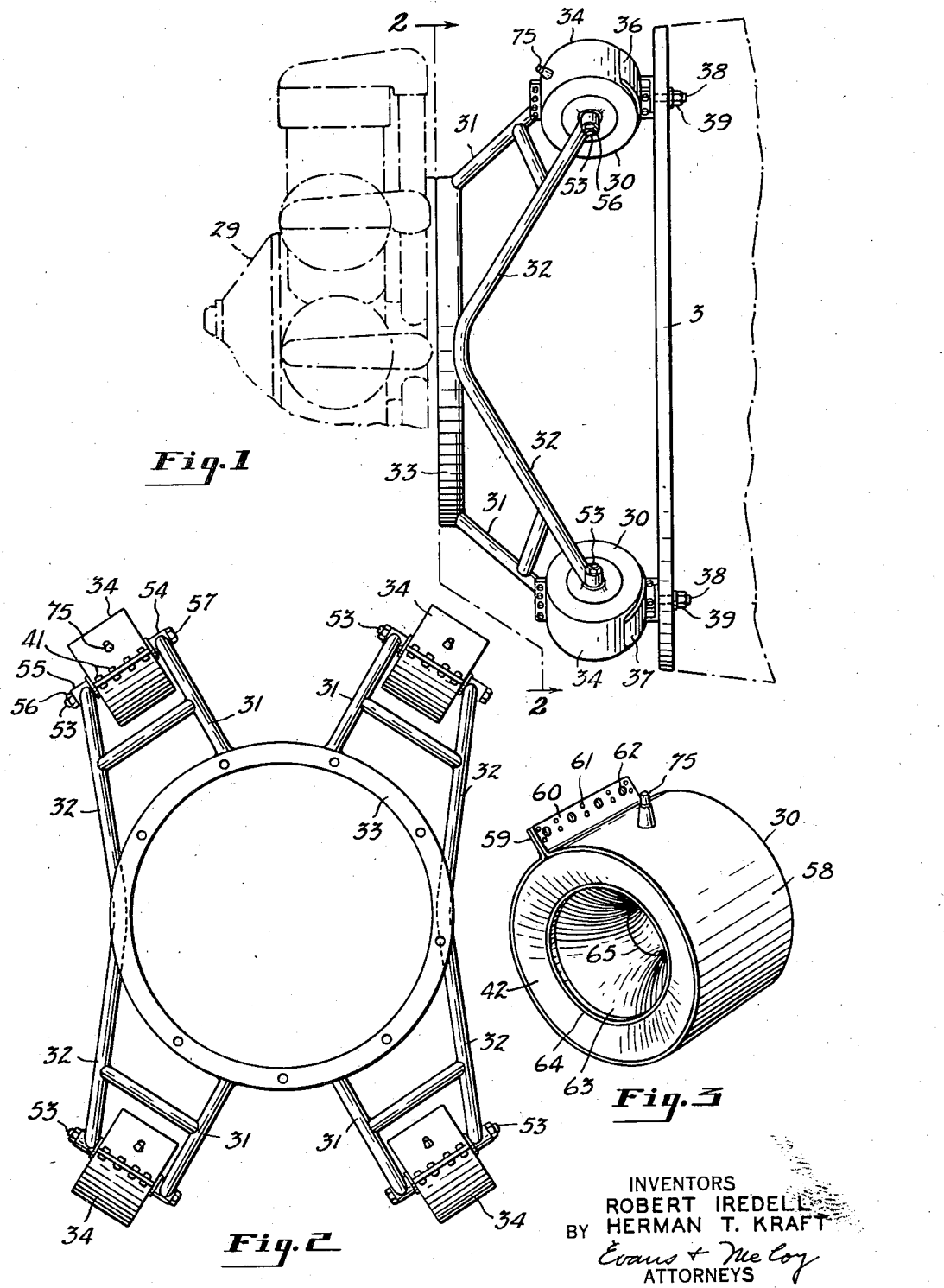

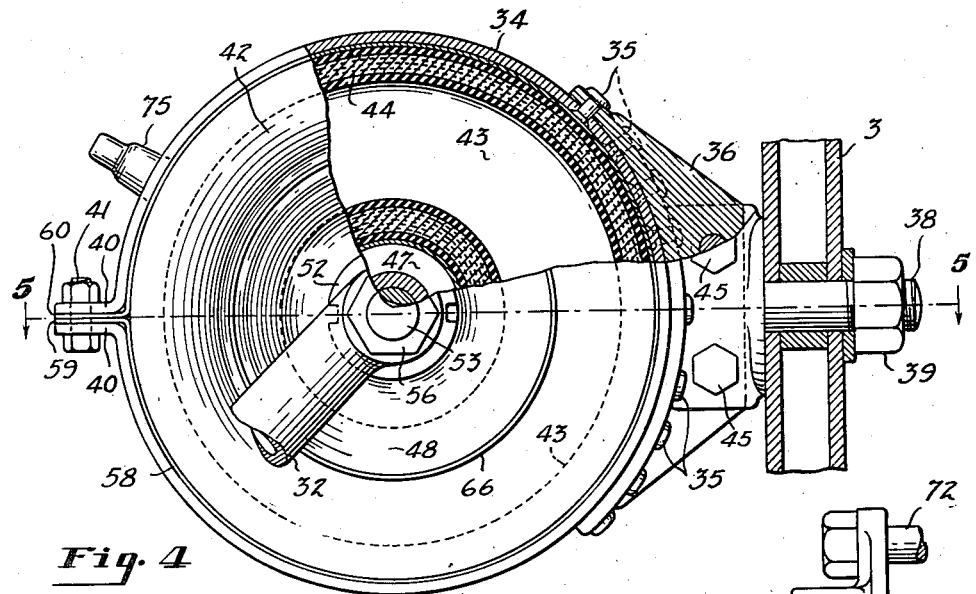
Fig. 4
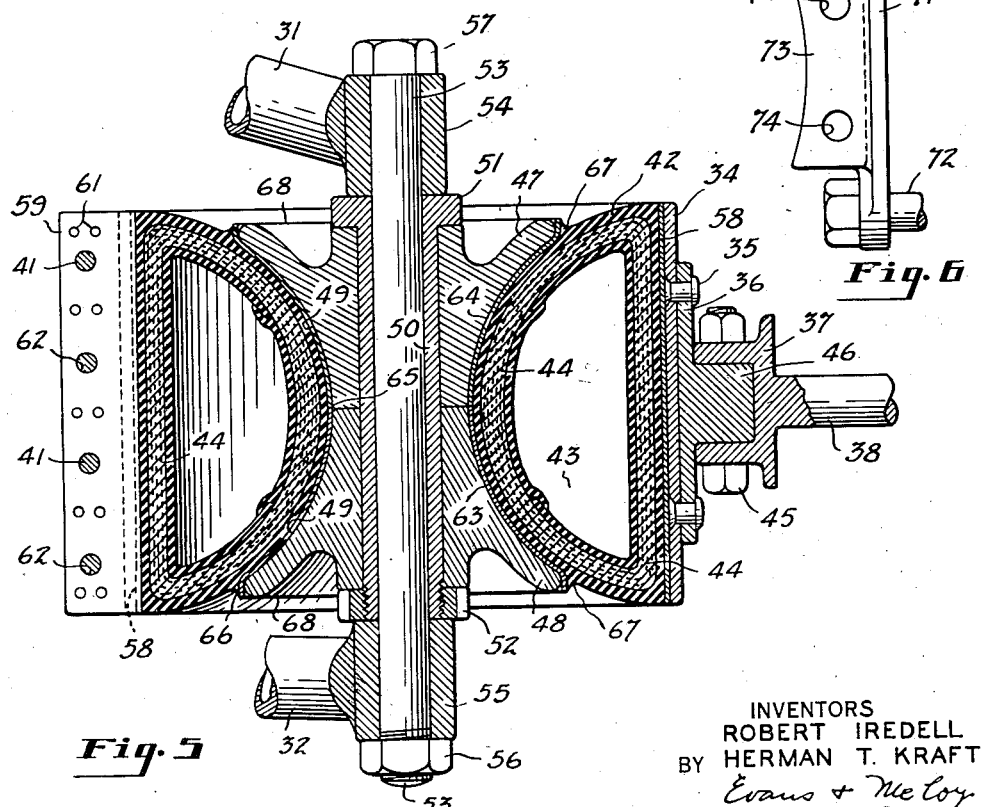
Fig. 5
Fig. 6
INVENTORS
ROBERT IREDELL
BY HERMAN T. KRAFT
Evans + McCoy
ATTORNEYS May 11, 1943.  R. IREDELL ET AL  2,318,862
SUSPENSION DEVICE
Filed March 4, 1940   3 Sheets-Sheet 3

Patented May 11, 1943

2,318,862

UNITED STATES PATENT OFFICE 2,318,862

SUSPENSION DEVICE

Robert Iredell and Herman T. Kraft, Akron, Ohio, assignors to The General Tire & Rubber Company, Akron, Ohio, a corporation of Ohio Application March 4, 1940, Serial No. 322,056

2 Claims. (Cl. 248—5)

This invention relates to suspension devices, and particularly to elastic suspensions or mountings for supporting engines so that vibration is absorbed and damped.

Both high and low speed engines when rigidly attached to a supporting structure subject such structure to severe vibrations or oscillations, which are objectionable because fatigue stresses are set up in the structure. In the event the structure is an automotive vehicle, the passengers are rendered uncomfortable and oftentimes irritable by the vibration of the engine. It is, therefore, an object of the present invention to provide an improved mounting device for attaching an engine to a supporting structure so that the transmission of vibration and oscillation from the engine to the supporting structure is reduced to a minimum.

Many engines are not operated at a constant speed or torque but are frequently called upon to deliver a varying amount of power. When the operator in control of the engine causes the power output to be rapidly changed or causes a rapid increase or decrease in speed of the engine, the supporting structure may be subjected to severe shocks for relatively short intervals of time caused by the increased or decreased torque loads transmitted. These shocks may cause loosening or failure of the attaching device in the case of many engines, particularly stationary engines. In the case of automobiles and airplanes these shocks are carried throughout the frame of the structure, resulting in discomfort to the passengers, as well as endangering the physical structure of the machine because of fatigue and other stresses. Therefore, it is an object of the invention to provide a mounting device of improved character which will absorb severe shocks and loads resulting from sudden acceleration or deceleration of an engine so that sudden strains applied to the supporting structure or frame of a vehicle carrying the engine are minimized.

Another object is to provide an engine mounting having improved shock and vibration absorbent characteristics without sacrificing the strength and without objectionably increasing the size and weight of the mounting.

Another object is to provide an improved mounting device in which a resilient and deformable cushioning element is employed having a chamber to receive air or other gas under pressure to assist in supporting the engine and absorbing shocks and vibrations. More specifically, the invention aims to provide a support for engines which employs a hollow annulus of rubber or the like that is secured between members attached one to the supporting structure and the other to the engine.

Another object is to provide means for mounting an engine or the like which is relatively simple in design and construction and inexpensive to manufacture, the device including features of construction which permit interchangeability of parts and facilitate assembly and disassembly for the purpose of repair or replacement. Other objects and advantages will become apparent as the description of the invention proceeds. This description is made in connection with the accompanying drawings which indicate embodiments of the invention, like parts throughout the several views being indicated by the same numerals of reference.

Fig. 1 is a fragmentary view of the front end of an airplane showing a modified form of resilient mounting for the engine;

Fig. 2 is a front elevational view of the mounting device shown in Fig. 5 and is taken substantially on the line indicated at 2—2 of Fig. 5;

Fig. 3 is a perspective view showing one of the resilient and elastic annular cushions used to support the engine in the mounting structure of Figs. 5 and 6;

Fig. 4 is an elevational detail, partly in section and with parts removed, illustrating the construction of one of the mounting devices shown in Figs. 1 and 2 and enlarged with respect thereto;

Fig. 5 is a sectional detail taken substantially on the line 5—5 of Fig. 4;

Fig. 6 is an elevational detail showing a modified form of bracket for attaching the mounting device to the supporting structure of the vehicle;

Figure 7:
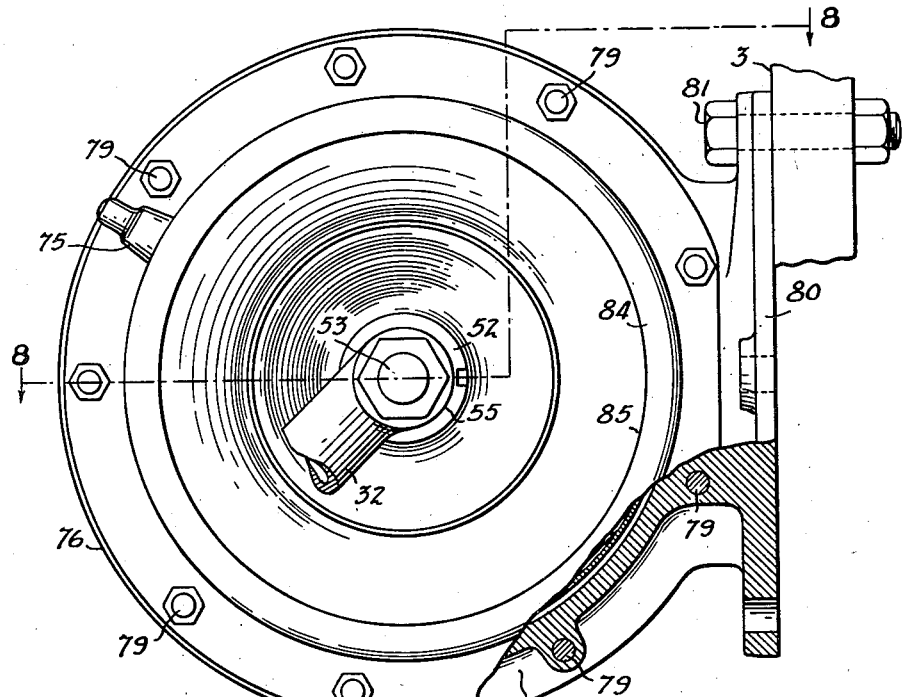
Fig. 7 is an elevational view with parts removed and partly in section showing a still further modification of the invention similar to the embodiment illustrated in Figs. 1 through 4 and having a ring-like attaching member which may be used to embrace the annulus or cushion member for securing the suspension device to the bulkhead or fire wall of an aircraft or other engine.

Generally, the present invention comprehends a device for supporting an engine to absorb vibrations and sudden torque loads, in which inner and outer members are provided with confronting faces, the outer member being of annular or shell-like form and preferably being integral or continuous throughout its entire circumference, or substantially so, although, if desired, it may be made in separable parts or segments. The inner and outer members are formed with spaced confronting faces, between which is disposed a resilient and deformable cushion having a chamber, which may be annular in extent, to receive air or gas under pressure. The present invention thus incorporates a pneumatic cushion or cushions for supporting the engine which are extremely efficient in absorbing vibrations and shocks and may be adjusted through variation in the pressure within the resilient shock absorbing elements to suit the requirements of the particular engine being supported or to suit the particular speed at which a given engine is to be operated. Suitable means is provided for preventing axial shifting movements of the resilient annulus or cushion with respect to both the inner and outer members of the supporting device. This shift resisting means may take the form of suitable interfitting configurations of the supporting members and a resilient annulus or annuluses may be adhesively secured to one or both of the supporting members. In the embodiments of the invention illustrated in the drawings, the supporting devices are shown in connection with the mounting of a radial type engine on the body or fuselage of an airplane or other aircraft. It is to be understood, however, that the same or similar mounting units may be used for other purposes and for mounting engines of other types in aircraft, automobiles and watercraft.

In Figs. 1 through 6 an embodiment of the invention is illustrated in which individual units 30 of the suspension system are disposed with their axes in a substantially common plane, as will later appear. Each of the units 30 is secured to the fire wall or bulkhead 3 of the aircraft structure. A pair of struts 31 and 32 extend from each of the units 30 in converging relation and are secured to a ring 33 to which engine 29 may be attached.

The outer support member of each of the suspension units 30 may be in the form of a substantially cylindrical shell 34 (Figs. 4 and 5) attached by countersunk rivets 35 or otherwise to a bracket 36 of arcuate shape which is received between the flanges of an attaching element or clevis 37 having a threaded shank portion 38 extending through the bulkhead 3 and receiving a nut 39, by means of which the body of the fitting may be drawn tightly against the bulkhead and thereby secured in place. Bolts 45 extend through the attaching element 37 and elongated boss 46 of the bracket 36 which is received by the element 37, to hold the parts together.

If desired, the shell 34 may be formed of a strip or plate of sheet steel or aluminum alloy, which is bent or formed to the cylindrical shape indicated, and provided with flanged ends 40 that may be drawn together by bolts 41.

Received within the shell 34 and circumferentially embraced thereby is a resilient cushion element, indicated generally at 42, which is in the form of an annulus having a substantially cylindrical outer surface and a curved inner surface, the latter preferably having the shape of a torus. The resilient cushion element 42 may be formed of rubber of like material suitably cured or vulcanized and is provided with a circumferentially extending internal chamber 43 to receive air under pressure so that the device may be inflated. As shown in Fig. 5, the walls of the element 42 may be of approximately uniform thickness so that the inside surface of the chamber 43 may approximately parallel the adjacent outside surface of the element. Desirably, a multiplicity of cord layers 44 arranged in diagonal or criss-cross form are embedded in the body of the element 42 and vulcanized in place so as to reinforce the same and strengthen the walls to withstand high air pressures in the chamber 43. The cords 44 may be placed in the deformable body by means of successive layers of cord material embedded in rubber arranged with the individual cords of successive layers extending in alternate or criss-cross directions, as is the custom in the manufacture of pneumatic vehicle tires.

Extending through the axial opening in the resilient annulus 42 is an inner support member in the form of a spool and comprising elements 47 and 48 which may be substantially identical, having curved tapering outer surfaces 49 which correspond in curvature and contour to the inner torus shaped surface of the cushion annulus or member 42. The spool elements 47 and 48 are disposed with their small diameter ends in abutting relation and are formed with aligned axial bores that receive a sleeve 50. This sleeve has an outwardly directed flange 51 at one end and it is threaded at the opposite end to receive a nut 52. The flange 51 and nut 52 engage the ends of the spools 47 and 48 to hold the latter in end to end relation on the sleeve 50.

A bolt 53 extends through the sleeve 50, extending beyond the ends of the latter to receive apertured ends 54 and 55 of the struts 31 and 32, respectively. Nut 56 on the threaded end of the bolt 53 and head 57 thereof draws the cylindrical spool-like ends 54 and 55 of the struts tightly against the ends of the sleeve 50. Thus, the spools 47 and 48 may oscillate or rotate slightly on the sleeve 50 while the latter is held tightly between the struts 31 and 32.

If desired, the outwardly directed cylindrical surface of the resilient cushion element 42 may be directly engaged by the inwardly directed cylindrical surface of the shell 34, the latter being clamped about the resilient element by the bolts 41, so that the frictional engagement between the shell and the resilient element is sufficient to prevent endwise and rotational movement of the resilient annulus in the shell. Furthermore, the resilient annulus 42 may be adhesively secured, as by vulcanization, to the shell 34 to positively prevent relative movement between these parts of the suspension unit. In the construction shown, a circumferentially extending sheet or band 58 is disposed about the cylindrical outer surface of the resilient annulus 42 and is secured thereto, as by vulcanization. It has been found that relatively thin metal, such as brass, is suitable for the band 58. At one portion of the band is a radially extending rib or fin which may be formed by outwardly directed flanged ends 59 and 60 of the band. The band ends 59 and 60 may be soldered or brazed or otherwise secured together, as by rivets 6, and are disposed between the flanged ends 40 of the shell 34 so as to be securely clamped therebetween by the bolts 41 which pass through suitable holes 62 formed in the band ends 59 and 60. Thus the bolts 41 serve to retain the band 58 in place within and embraced by the shell 34 to hold the resilient annulus 42 in position.

Desirably, tapering shells 63 and 64, spun or otherwise formed of a relatively light sheet metal such as brass, are disposed within the opening through the annulus 42 and with their small diameter ends in abutting relation, or substantially so, and have seating engagement with the spool or support elements 48 and 47, respectively. The shells 63 and 64 are adhesively secured to the torus shaped inwardly directed surface of the resilient annulus 42, such as by vulcanization during the curing of the annulus. Accordingly, the shells 63 and 64 may be permanently attached to the inside of the annulus while the band 58 may be permanently attached to the outwardly directed surface of the annulus. If desired, the shells 63 and 64 may be integral or they may be secured together, as by soldering or brazing, along the meeting line of their abutting ends, indicated at 65. The outer ends or edges of the shells 63 and 64 are curved away from the surface of the resilient annulus 42, as indicated at 66, so that the shells do not cut or chafe the annulus when the latter is deformed by the application of a load to the suspension device. Since the outer cylindrical band 58 and the inner tapered shells 63 and 64 are secured to the resilient annulus 42 during the curing of the latter, these thin metal parts are permanently attached to the annulus and are removable therewith as a unit when the annulus is taken from the suspension unit for repair or replacement. Fillets 67 may be formed of the rubber of the annulus adjacent the curved ends 66 to further resist cutting or other injury to the annulus when the latter is deformed.

As shown in Fig. 5, ends 68 of the spool or inner members which comprise the elements 47 and 48 are disposed within the plane of the ends of the resilient annulus 42 and the outer shell 34 has substantially continuous engagement with the annulus over a greater axial length of the latter than the inner supporting element or spool. This arrangement increases the resistance of the unit to objectionable or excessive axial movement under loads and when the pneumatic cushion is deflated.

In Fig. 6 is illustrated a modified form of attaching element formed with a plate or body portion 71, which is disposed flatwise against the bulkhead 3 and attached to the latter by means of bolts 72. A pair of spaced parallel flanges, one of which is indicated at 73, embraces the elongated boss 46 of the bracket 36 similarly to the manner in which the boss is embraced by the flanges of the attaching element 37 shown in Fig. 9. Aligned apertures 74 in the flanges 73 receive the holding bolts 45. This modified form of attaching element provides a more rigid structure and because of the spaced bolts 72 holding the same to the fire wall or bulkhead of the aircraft, rotational movement of the unit is more effectively resisted and restricted to the resilient annulus 42.

An inflating stem 75 provided with a suitable valve is attached to the annulus 42 and projects from the outer surface thereof, suitable apertures being provided through the band 58 and shell 34 to receive the stem. Accordingly, air or gas under pressure may be introduced into the chamber 43 through the stem 75 to vary the resiliency of the cushion as desired.

Figure 8:
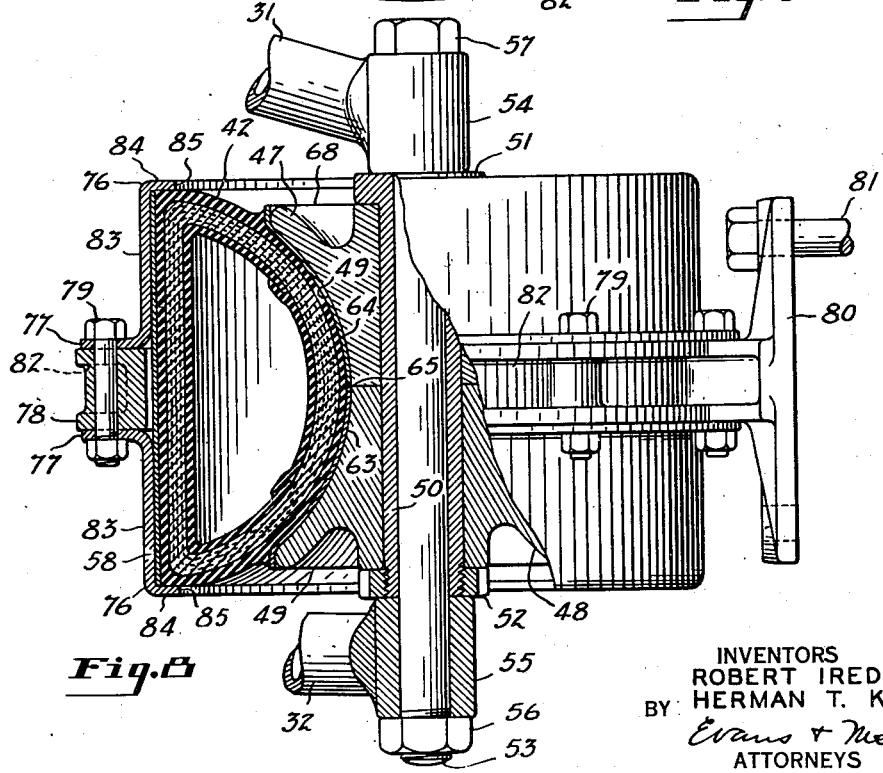
Fig. 8 is a view, partly in section and with parts removed, taken substantially on the line 8—8 of Fig. 7.

In Figs. 7 and 8 is illustrated a modified construction for the type of suspension unit illustrated in Figs. 1 through 6, in which the shell 34, previously described, is replaced by a pair of cylindrical shells 76 which are formed with radially disposed flanged rims 77 that are located against opposite sides of a ring 78 and secured thereto by bolts 79. The ring 78 is formed with or secured to a tangentially disposed foot or base 80 which is secured by bolts 81 to the bulkhead or fire wall 3 of the aircraft. Between the openings for the bolts 79 the ring 78 is hollowed out, as indicated at 82, so that the ring is approximately U-shaped in cross-section, this shape of the ring making the same lighter in weight without objectionable decrease in strength.

Cylindrical portions 83 of the pans or shells are axially aligned with one another and extend in opposite directions away from the ring 78. These cylindrical portions of the shells have inwardly directed cylindrical surfaces which frictionally engage the outwardly directed cylindrical surface of the resilient annulus 42 to resist turning of the latter within the ring 78. In the event that the thin metal band 58 is used, the ends thereof may be welded or soldered together at the surface of the annulus 42, the flanged ends 59 and 60 being omitted; or if desired, the band 58 may be in the form of a section from a seamless tube of brass or bronze. The outermost ends of the shells 76 are formed with inwardly extending flanges 84 which engage the ends of the annulus 42. The inner supporting member of the suspension unit, which comprises the spool elements 47 and 48 and their related parts, may be the same as those previously described, and the same reference numerals have been applied thereto in the modification of Figs. 7 and 8. The bolt 53 and related parts of the inner member extend through openings 85 in the ends of the shells 76, these openings being large enough to permit movement of the inner member as the resilient annulus 42 is compressed under loads.

The present invention thus provides a suspension system incorporating individual suspension units which employ resilient deformable cushion members of annular or circular form that absorb vibration and severe shocks such as are encountered in the operation of aircraft engines. In its preferred form the invention comprises deformable annuluses or cushions having circumferentially continuous chambers formed therein to receive air or gas under pressure, each cushion member being confined by inner and outer supporting members which are so interlocked with one another and about the annulus or annuluses that complete separation of the support members from one another is substantially prevented, even though the cushion member be destroyed.

An important feature of the present invention is that the design and arrangement of the resilient cushions, as well as the manner in which they are mounted between the inner and outer support members, allows the air or pneumatic pressure in the cushion chambers to be varied as desired. In case all the air pressure in the cushions is released therefrom, the suspension units are still capable of sustaining their normal loads without objectionable loss in vibration damping and shock absorbing characteristics.

Other modes of utilizing the principles of the invention may be resorted to, changes being made, as desired, in the particular construction and arrangement of parts shown and described, it being understood that numerous modifications and alterations are contemplated and that the embodiments disclosed are given for purposes of explanation and illustration only.

What we claim is:

1. A suspension device comprising a spool, a resilient annulus on the spool and having an outwardly directed circular surface, an attaching ring embracing the annulus about said surface, and a pair of shells disposed one on each side of the ring and connected to the same, said annulus being circumferentially embraced by each of the shells.

2. A suspension device comprising a spool, a resilient annulus on the spool and having an outwardly directed circular surface, an attaching ring embracing the annulus about said surface, and a pair of shells circumferentially embracing the annulus and disposed one on each side of the ring, said shells having edge flanges directed radially inwardly and overlying side portions of the annulus to resist axial displacement of the latter.

ROBERT IREDELL.
HERMAN T. KRAFT.